Aug. 7, 1945.　　　　W. A. DERR　　　　2,381,264
SYNCHRONIZING CONTROL SYSTEM
Filed April 8, 1944
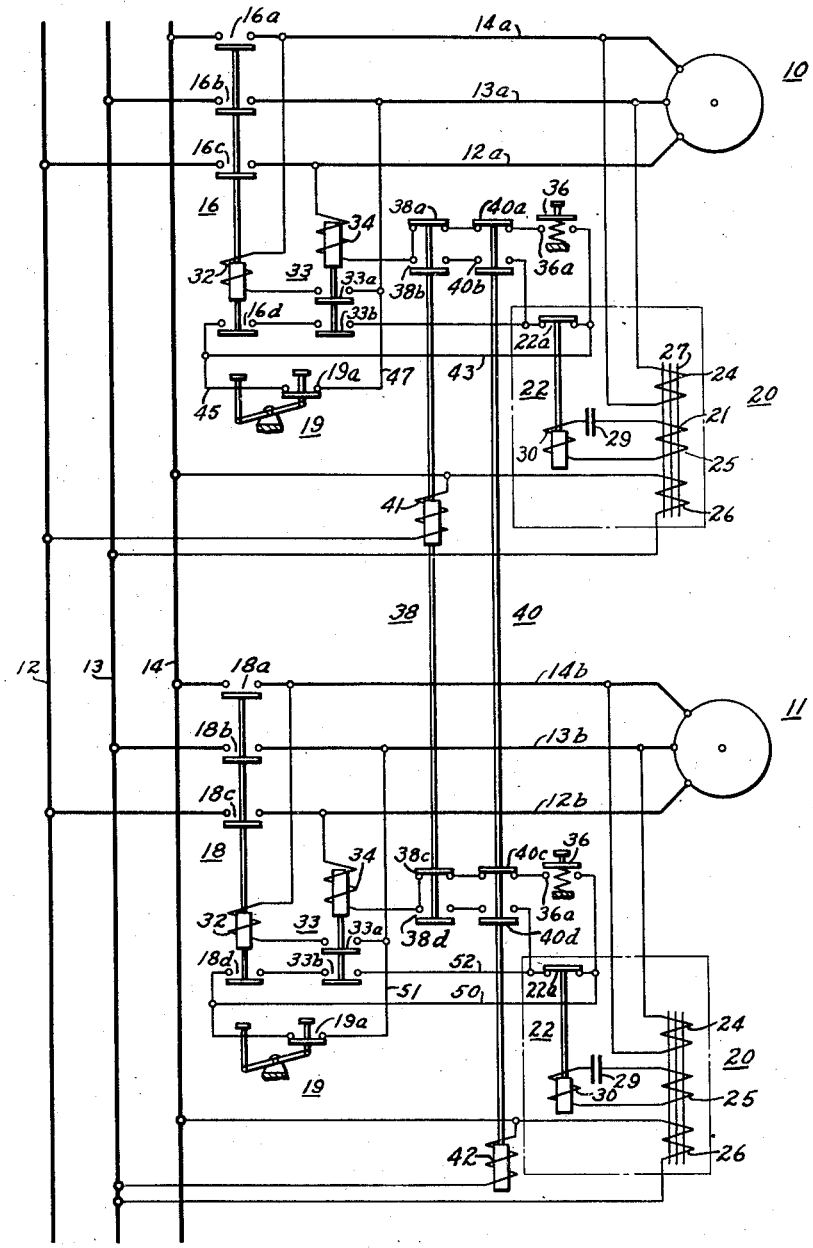
WITNESSES:
Leon M. Garman
F. V. Giolma
INVENTOR
Willard A. Derr.
BY G. M. Crawford
ATTORNEY Patented Aug. 7, 1945

2,381,264

UNITED STATES PATENT OFFICE 2,381,264

SYNCHRONIZING CONTROL SYSTEM

Willard A. Derr, Wilkinsburg, Pa., assignor to Westinghouse Electric Corporation, East Pittsburgh, Pa., a corporation of Pennsylvania Application April 8, 1944, Serial No. 530,149

11 Claims. (Cl. 171—118)

My invention relates, generally, to control systems, and it has reference, in particular, to contol systems for synchronizing alternating current generators.

Generally stated it is an object of my invention to provide a synchronizing control system which is simple and inexpensive to manufacture and is easy to operate.

More specifically it is an object of my invention to provide a control system for synchronizing an alternating current generator with an alternating current bus only when the frequencies and voltages thereof are sufficiently close.

Another object of my invention is to provide a simple and flexible control system which will permit manually connecting a generator to an alternating current bus when the bus is deenergized, and will prevent making any connection thereto except through an automatic synchronizing circuit when the bus is energized.

Yet another object of my invention is to provide a simple automatic synchronizing system which provides complete protection against a reduced voltage or voltage failure on any phase of the generator or of the bus to which it is to be connected.

Still another object of my invention is to provide for rendering an automatic synchronizing circuit inoperative when the bus to which the generator is to be connected is deenergized and provide for manually connecting the generator to the bus.

It is also an important object of my invention to provide for disconnecting the generator from the bus and also prevent its connection thereto, either automatically or manually, in the event of failure of voltage on any phase of either the generator or bus.

Other objects will in part be obvious, and will in part be explained hereinafter.

In accordance with one embodiment of my invention, a pair of generators which are to be connected to an alternating current bus are each provided with synchronizing relays which determine, in conjunction with a manual control switch, when the generators may be automatically connected to the bus. Auxiliary relays connected to different phases of the bus interrupt the synchronizing circuits provided by the synchronizing relays in the event of a failure of voltage on any of the phases of the bus. An auxiliary manual control switch provides for connecting the generators to the bus independently of the synchronizing relays when the bus is deenergized. Provision is made by having a main contactor energized from one phase of the generator and an auxiliary contactor energized from another phase of the generator for controlling the operation of the main contactor, for adequate protection against failure of voltage on any of the generator phases.

For a more complete understanding of the nature and scope of my invention, reference may be made to the following detailed description, which may be read in connection with the accompanying drawing in which the single figure is a diagrammatic view of a power system embodying the principal features of the invention.

Referring to the single figure of the drawing, the reference numerals 10 and 11 may denote polyphase alternating current generators which are disposed to be connected to the conductors 12, 13 and 14 of an alternating current bus by means of switches 16 and 18, respectively. Since the circuits and apparatus for the two generators are similar, corresponding elements will be indicated by the same numerals hereinafter.

In order to provide for automatically synchronizing the generators 10 and 11 with the bus automatic control circuits may be provided comprising manual control switches 19 and synchronizing means 20.

The synchronizing means may be of any suitable type, comprising, for example, control transformers 21 and synchronizing relays 22. The control transformers 21 may be provided with a plurality of windings 24, 25 and 26 positioned on common magnetic core members 27. The windings 24 are connected to one phase of the generators 10 and 11, while the windings 26 are connected between the conductors 13 and 14 of the bus. The windings 24 and 26 may be so related on the core members 27 that they normally oppose each other. The third windings 25 may be connected through condensers 29 to the operating windings 30 of the synchronizing relays 22. The relationship of the windings 24 and 26 will be such that the contact members 22a of the synchronizing relays 22, which are closed in the deenergized position, will normally be held open by the voltage on the bus until the voltage of the generators 10 and 11 reach a sufficient value to neutralize the effect of the windings 24 whereupon the relay returns to the deenergized position and contact members 22a close.

In order to provide against reduced voltage or voltage failure on any of the phases of either of the generators, the operating windings 32 of the main switches 16 and 18 may be energized from one phase of the generators 10 and 11, respectively, through auxiliary control switches 33. The operating windings 34 of auxiliary control switches 33 may be disposed for connection to another phase of the generators 10 and 11, thus providing for deenergization of the main switches 16 and 18 in the event of failure of voltage on any of the phases of the generators.

In order to provide for manually connecting the generators 10 and 11 to the bus conductors 12 through 14 when they are deenergized, manual control circuits may be provided. These circuits may include auxiliary manual control switches such as the push button switches 36, for effecting energization of the operating windings 24 of the auxiliary control switches 33 independently of the synchronizing means 20.

With a view to preventing operation of either of the main switches 16 and 18 through operation of the auxiliary manual control switches 36 when there is voltage on any of the bus conductors 12 through 14 either from one of the generators or from some other source, means such as the voltage responsive relays 38 and 40 may be provided. The voltage relay 38 may be provided with an operating winding 41 which may be connected between the bus conductors 12 and 14, so as to effect operation of the relay whenever the voltage between the bus conductors 12 and 14 is above a predetermined minimum operating value. The operating winding 42 of the voltage relay 40 may be connected to a different phase of the bus, being, for example, connected between the bus conductors 13 and 14. By providing normally closed contact members 38a, 40a and 38c, 40c in series circuit relation with the push button control switches 36, manual operation of the main switches 16 and 18 may be prevented whenever the voltage of any of the phases of the bus is above a predetermined minimum value. Likewise, by providing normally open contact members 38b, 40b, and 38d, 40d in series circuit relation with the contact members 22a of the synchronizing relays 22, operation of the main control switches 16 and 18 to connect the generators to the bus may be prevented, or in the case that the generator is connected, it will thereby be disconnected.

With the system in the deenergized position as shown, the synchronizing means 20 is rendered ineffective by the open contact members 38b, 40b of the voltage responsive relays, and the generator 10 may be connected to the bus merely by closing the auxiliary manual control push button switch 36, and the manual control switch 19. An operating circuit is thereby provided for the operating winding 34 of the auxiliary control switch 33, extending from the generator 10 through conductor 12a, operating winding 34, normally closed contact members 38a, normally closed contact members 40a, contact members 36a, conductor 43, conductor 45, contact members 19a, conductor 47, and conductor 13a back to the generator 10. The auxiliary control switch 33 operates if the generator voltage if sufficiently high, completing an energizing circuit for the operating winding 32 of the main control switch 16 through contact members 33a and between the conductors 14a and 13a of the generator 10. The main control switch 16 operates if the voltage of the generator is sufficiently high and connects the generator 10 to the bus through contact members 16a, b and c. The voltage responsive relays 38 and 40 operate when the bus is energized, closing contact members 38b and 40b, thus providing a holding circuit in conjunction with the auxiliary contact members 16a and 33b of the main and auxiliary control switches, and contact members 19a of the manual control switch.

The generator 11 may now be connected to the bus conductors 12 through 14 only through operation of its associated synchronizing means 20, since the voltage relays 38 and 40 were actuated to the operated position, interrupting the manual control circuit through contact members 38c and 40c when the voltage of the conductors 12 through 14 reached a predetermined minimum value. The operation may be initiated by closing contact members 19a of the manual control switch.

As soon as the voltage of the bus reached a predetermined value after the generator 10 was connected thereto, the operating winding 28 of the synchronizing means induced a voltage in the tertiary winding at 26 which operated the synchronizing relay 22 of the generator 11 to open its normally closed contact members 22a. As soon as the voltage of generator 11 approaches that of the bus conductors 12 through 14, and the generator frequency approaches that of the conductors, the operating winding 24 which is energized from the generator 11, substantially neutralizes the flux produced by the operating winding 26. Accordingly, the operating winding 30 of synchronizing relay 22 is substantially deenergized, and the relay closes its contact members 22a.

An energizing circuit is thereby provided for the operating winding 34 of the auxiliary control switch 33. This circuit extends from conductor 12b through the operating winding 34, normally open contact members 38d, normally open contact members 40d, contact members 22a, conductor 50, contact members 19a, and conductor 51 back to conductor 13b of the generator 11.

The auxiliary control switch 33 operates, closing contact members 33a to provide an energizing circuit for the operating winding 32 of the main control switch 18 between conductors 13b and 14b of the generator 11. The main control switch 18 thereby connects the generator 11 to the conductors 12, 13 and 14 through contact members 18c, 18b and 18a. At the same time a holding circuit is provided for the operating winding 34 extending through contact members 19a of the manual control switch 19, contact members 18a, contact members 33b, conductor 52, contact members 40d, contact members 38d and operating winding 34 to conductor 12b of the generator 11.

By connecting the operating windings of the main and auxiliary control switches 32 and 33 to different phases of the generator, adequate protection against reduced voltage or failure of voltage on any of the phases of the generator is provided, since a reduced voltage or a failure of voltage on either of the operating windings will result in deenergization of one or another of the windings, causing disconnection of the generator from the bus through opening of the main control switch. Since the voltage responsive relays 38 and 40 must remain in the energized position to maintain the operating circuits for the auxiliary control switches, a reduction of or failure of voltage on the operating windings of either of these relays results in deenergization of the operating windings 34, so that the auxiliary control switches 33 return to the deenergized position. This disconnects the operating windings 32 of the main control switches 16 and 18 from the generator conductors, so the main control switches 16 and 18 open and disconnect the generators from the bus. Since the voltage responsive relays 38 and 40 interrupt the manual control circuits whenever they are in the energized position, and they likewise interrupt the automatic control circuits whenever they are in the deenergized position, the manual and automatic control circuits may be selectively rendered inoperative, depending on whether or not there is sufficient voltage on any one of the or all of the phases of the bus.

From the above description and accompanying drawing, it will be apparent that I have provided a simple and flexible synchronizing system which is inexpensive to manufacture and easy to operate. Complete protection against reduction or failure of voltage is provided. At the same time provision is made for either manual or automatic control, depending upon the voltage conditions of the bus.

Since certain changes may be made in the above described construction and different embodiments of the invention may be made without departing from the spirit or scope thereof, it is intended that all the matter contained in the above description and shown in the accompanying drawing shall be considered as illustrative, and not in a limited sense.

I claim as my invention:

1. The combination in a control system for synchronizing a polyphase alternating current generator and a polyphase alternating current bus, of switch means operable when the voltage of one phase of the generator reaches a predetermined value to connect the generator to the bus, control means operable when the voltage of another phase of the generator reaches a predetermined value to provide an operating circuit for said switch means, and synchronizing means operable in response to a prdetermined relation of the generator and bus frequencies to provide an energizing circuit for the control means.

2. A synchronizing control system for an alternating current generator and an alternating current bus comprising, switch means operable to connect the generator to the bus, synchronizing means responsive to the generator and bus frequencies operable to provide an operating circuit for the switch means only when the generator and bus frequencies reach a predetermined relation, control means effective to provide an operating circuit for the switch means independently of the synchronizing means, and means responsive to energization of the bus to render the control means ineffective.

3. The combination with a pair of alternating current generators disposed to be connected to an alternating current bus, of switch means for each generator energizable from one phase of said generator to connect said generator to the bus only when the voltage of said phase has a sufficient value, relay means energizable from another phase of each generator to provide an energizing circuit for said switch means only when the voltage of said other phase has sufficient value, a synchronizing device energized from the generator and bus for providing for energization of the relay means only when the generator and bus frequencies are in predetermined relation, control means operable manually to effect energization of the relay means thereof independently of the synchronizing means, and means responsive to energization of the bus operable to render the control means ineffective to effect energization of the relay means.

4. In a control system for an alternating current generator disposed to be connected to an alternating current bus, in combination, switch means operable to connect the generator to the bus, a synchronizing device responsive to predetermined relations of the generator and bus frequencies, a manual control switch, circuit means including contacts of the synchronizing device and the manual control switch for selectively providing operating circuits for operating the switch means to connect the generator to the bus, an additional manual control switch operable to prevent operation of the switch means, and means responsive to predetermined voltage conditions of the bus for limiting the control of the manual control switch over the switch means.

5. A control system for connecting an alternating current generator to an alternating current bus comprising, switch means operable to connect the generator to the bus, a manual control switch, a synchronizing device responsive to predetermined relations of the bus and generator voltages and frequencies, circuit means selectively controlled by the manual control switch or the synchronizing device to provide an operating circuit for the switch means, an additional manual control switch for preventing the operation of the switch means by the manual control switch or the said synchornizing device, and means responsive to predetermined voltage conditions of the bus to selectively render one or another of the additional manual control switch and synchronizing device ineffective to effect operation of the switch means.

6. In a synchronizing system for a polyphase alternating current generator disposed to be connected to an alternating current bus, in combination, synchronizing means responsive to predetermined relations of the generator and bus frequencies, manual control means, switch means operable to connect the generator to the bus, circuit means controlled by the synchronizing and manual control means to provide an operating circuit for the switch means, auxiliary manual control means cooperative with said manual control means to provide for operation of the switch means independently of the synchronizing means, and control means responsive to predetermined voltage conditions of at least two phases of the bus cooperative with the auxiliary manual control means and the synchronizing means to render the synchronizing means ineffective when the voltage on any phase of the bus falls below a predetermined value and to render the auxiliary manual control means ineffective so long as the voltage of any phase of the bus is above a predetermined value.

7. A synchronizing control system for an alternating current generator disposed to be connected to an alternating current bus comprising, switch means operable to connect the generator to the bus, synchronizing means responsive to predetermined relations of the bus and generator frequencies, a manual control switch cooperative with the synchronizing means to provide an operating circuit for the switch means, means responsive to operation of the switch means to provide a holding circuit therefor through the manual control switch, an auxiliary manual control switch cooperative with said manual control switch to provide an additional operating circuit for the switch means independently of the synchronizing means, and means responsive to a predetermined voltage condition of the bus operable to interrupt the additional operating circuit and complete said operating circuit.

8. A synchronizing system for a pair of polyphase alternating current generators disposed to be connected to an alternating current bus comprising, switch means operable to connect each of the generators to the bus, synchronizing means responsive to frequency differentials between the generators and bus for preventing operation of each of the switch means until each of the generator frequencies are in predetermined relation to the bus frequency, manual control means operable to initiate operation of each of the switch means, additional manual control means cooperative with said manual control means to provide for operation of said switch means independently of the synchronizing means, and means responsive to predetermined voltage conditions on the bus to selectively control the operation of the switch means in conjunction with the synchronizing means and the additional manual control means.

9. The combination in a control circuit for synchronizing a polyphase alternating current generator and a polyphase bus, of a manual control switch, synchronizing means responsive to predetermined relations of the generator and bus frequencies, a switch operable under the control of the manual control switch and the synchronizing means to connect the generator to the bus, an additional manual control switch operable in conjunction with said manual control switch to provide for operation of the switch independently of the synchronizing means, and means responsive to the voltage conditions of a plurality of the phases of the bus operable to prevent operation of the switch under the control of the additional manual switch whenever more than a predetermined voltage exists on one of the bus phases and to prevent operation of the switch means under the control of the said means whenever the voltage of one of the bus phases is less than a predetermined value.

10. The combination in a control circuit for synchronizing a polyphase generator and a polyphase bus, of a switch operable to connect the generator to the bus, a control relay having an operating winding disposed to be energized from one phase of the generator and operable to provide an energizing circuit for the switch from another phase, a manual control switch, a synchronizing relay energized from the generator and bus operable when the generator frequency and bus frequency are in predetermined relation to provide an energization circuit for the operating winding of the control relay in conjunction with the manual control switch, an additional manual control switch operable in conjunction with the manual control switch to provide an additional energizing circuit for the control relay, and a pair of voltage responsive devices disposed to be energized from different phases of the bus selectively operable when the voltages of the respective phases are above a predetermined minimum to interrupt the additional energizing circuit and complete said energizing circuit.

11. A control system for a pair of polyphase generators which are disposed to be connected to a polyphase bus comprising, a manual control switch for each generator, a synchronizing relay for each generator, said relays being responsive to predetermined frequency and voltage relations of its associated generator and the bus, switch means for each generator operable under the control of the manual control switches and the synchronizing relays to connect the generator to the bus, an auxiliary manual control switch cooperative with the manual control switch to control the operation of the switch means, and a pair of voltage responsive relays connected to different phases of the bus and each having normally open contact members connected in series circuit relation with each of the synchronizing relays and normally closed contact members connected in series circuit relation with the auxiliary manual control switches.

WILLARD A. DERR.